United States Patent [19]

Harman

[11] 4,027,217

[45] May 31, 1977

[54] SPEED CONTROL FOR A MOTOR

[75] Inventor: Jefferson H. Harman, Thousand Oaks, Calif.

[73] Assignee: Pertec Computer Corporation, Los Angeles, Calif.

[22] Filed: Feb. 12, 1975

[21] Appl. No.: 549,333

[52] U.S. Cl. .............................. 318/313; 318/318; 318/480

[51] Int. Cl.² .......................................... H02P 5/06

[58] Field of Search .......... 318/313, 603, 640, 318, 318/480

[56] References Cited

UNITED STATES PATENTS

| | | | |
|---|---|---|---|
| 3,330,149 | 7/1967 | Scott, Jr. ........................ | 318/313 X |
| 3,370,289 | 2/1968 | Hedgecock et al. ............ | 318/603 X |
| 3,731,301 | 5/1973 | Davis .............................. | 318/313 X |
| 3,766,459 | 10/1973 | McIntosh et al. ............... | 318/603 |
| 3,821,604 | 6/1974 | Walrauen ......................... | 318/313 |
| 3,898,545 | 8/1975 | Coppa et al. .................... | 318/313 |

*Primary Examiner*—B. Dobeck
*Attorney, Agent, or Firm*—Lindenberg, Freilich

[57] ABSTRACT

The spindle motor for a flexible recording disk is connected to a disk with an annular track of optical markings which are scanned to derive therefrom a train of reset pulses for a counter counting higher frequency clock pulses. Reaching of a particular count state is ascertained for each reset cycle to obtain a train of pulses of constant duration with pauses inbetween, varying with motor speed. A steady signal linearly varying with motor speed is derived from that train, compared with a reference and used to control the motor.

9 Claims, 3 Drawing Figures

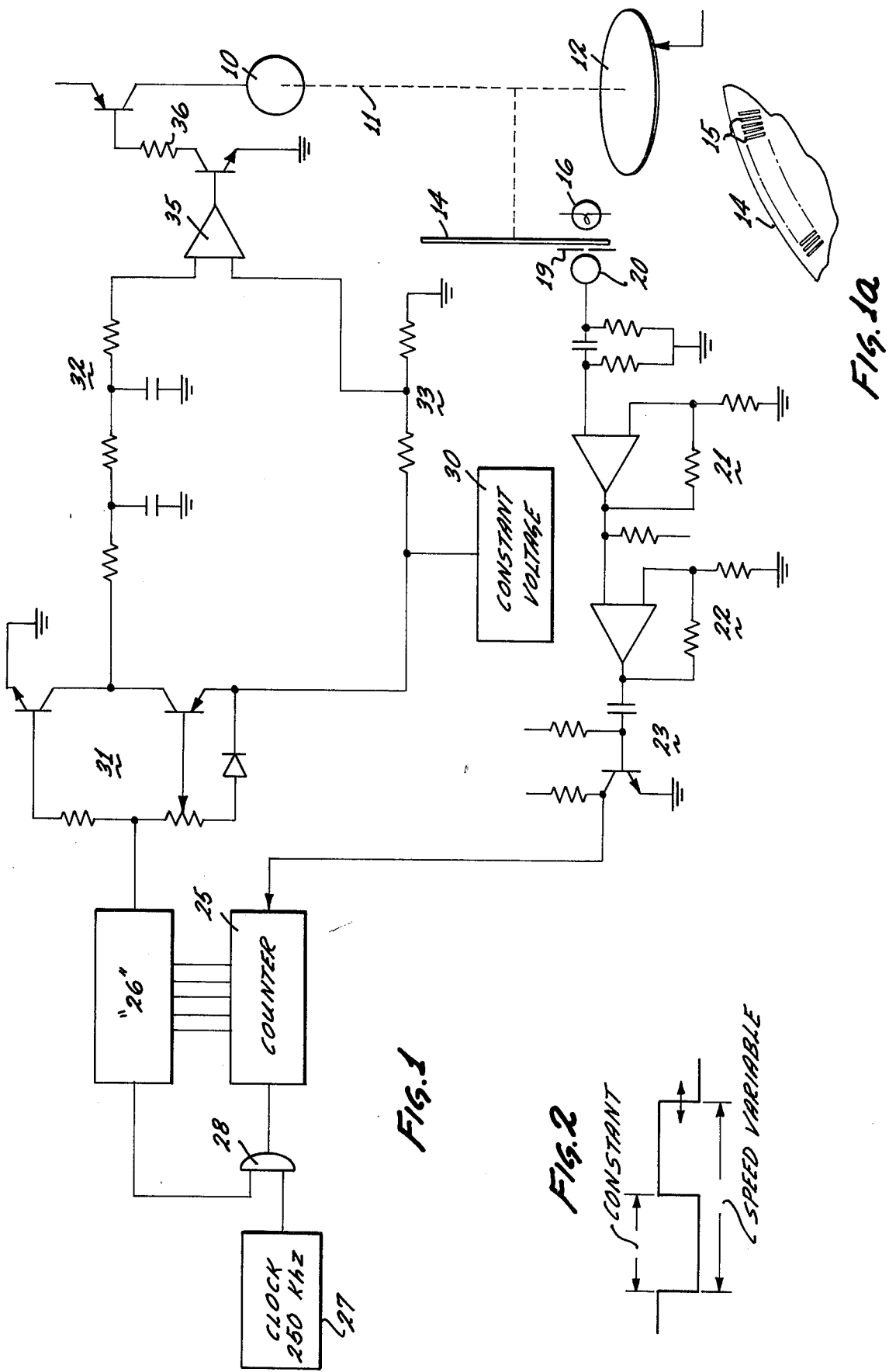

SPEED CONTROL FOR A MOTOR

BACKGROUND OF THE INVENTION

The present invention relates to the speed control for electric motors and more particularly but not exclusively the invention relates to control of the speed of a low inertia, fast response spindle motor driving a light weight recording disk, particularly of the flexible type commonly referred to also as floppy disk.

Motor speed control, particularly for d.c. motors is a well developed art. Usually the control circuit includes a tachometer feedback providing a signal that represents the speed of the motor. An error signal is formed in some fashion under utilization of a reference signal from an appropriate source, and the motor is controlled in response to the comparison between feedback reference signals. Generally speaking, a choice is sometimes available between a high inertia, slow response motor, wherein the speed is kept constant to a considerable extent by fly wheel effect; and a low inertia, fast response motor in which constancy of speed is primarily determined by active control of the motor. The invention is primarily related to improvements in the latter type of control.

Generally speaking, the feedback control for motors employs in some instances the principle of frequency shift and discrimination. The feedback signal developed in such a system is an oscillation signal whose frequency changes with motor speed. By comparing the frequency with a standard, speed changes can be detected, and the detected deviation is used in some fashion to control the motor. Among the elements used for obtaining the a.c. feedback is an optical tachometer disk having markings which are optically scanned, and the alterations in contrast are translated by the scanner into a a.c. signal. The invention does relate to that kind of feedback.

The motors used for driving a flexible disk are controlled, for example, by way of pulses to obtain the desired degree of accuracy. It was found, however, that a motor when controlled in this fashion runs rather noisely.

SUMMARY OF THE INVENTION

It is an object of the present invention to provide for a new and improved control operation for motors, such as a d.c. motor driving a recording disk.

In accordance with the preferred embodiment of the invention, it is suggested to couple a disk (not the recording disk) to the motor to be controlled for rotation therewith, the disk having annularly arranged distinguishable and detectable, preferably optically detectable markings. The passage of these markings is scanned and converted into a train of reset pulses whose rate of recurrance is high as compared with the rotational frequency of the disk and/or motor. A counter receives clock pulses at a still higher frequency, counts them, but is reset by each reset pulse. A count state detection circuit is connected to the counter and participates in the differentiation between two count number ranges, one running from the counter state following resetting to a particular number, the other range extending from that number up to any number actually reached (or which could have been reached by the counter) immediately prior to resetting. This detection circuit provides a train of pulses, or a pulse-pause sequence, corresponding to the alternation between these two count number ranges. The pulses have a fixed amplitude so that the average voltage (or current) of the pulse-pause sequence is linearly related to the motor speed. That voltage is compared with a reference, and the result of the comparison is used to control the motor.

It can thus be seen, that following each reset pulse as derived from the disk-scanner assembly a pulse (or a pause) of fixed duration is metered, and the duration of the subsequent pause (or pulse) varies with the frequency of the reset pulses, i.e., with motor speed. Averaging the pulse-pause sequence as to signal level established a speed dependant steady signal to be used for control of the motor.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a block diagram, partially a circuit diagram and schematic view of an example for practicing the preferred embodiment of the invention;

FIG. 1a shows a detail of FIG. 1; and

FIG. 2 is a timing diagram for signals developed in the circuit shown in FIG. 1.

Proceeding now to the detailed description of the drawings, FIG. 1 depicts a low inertia, fast response motor 10 with a flat, printed circuit like rotor, and provided for rotating a spindle 11 to which is affixed a recording disk 12 which in turn cooperates with a transducer, indicated by arrow 13, for transfer of information. Another disk, 14, is also mounted on shaft 11, rotating therewith and being provided with an annular track 15 of markings. The disk 14 may be of opaque construction, and the markings may be established by equidistantly spaced transparent windows.

As a motor, spindle and disks rotate, disk 14, and here particularly the transparent track markings 15 pass a light source 16. A solar cell, serving as detector 20, is disposed on the other side of disk 14. A mask 19 having one or more apertures may be interposed between detector cell 20 and disk 14. Thus, the detector 20 receives a triangularly modulated illumination wherein the frequency of the alternation is strictly proportional to the rotational speed of the motor. (Strictly speaking, the proportionality exists only as to the spindle, but if the load is constant, torsional distortions can be disregarded).

An amplifier 21 converts the variable current provided as output of cell 20 into a variable voltage, and a squaring circuit 22 establishes a train of rectangular voltage pulses. A directionally effective differentiating circuit 23 provides spikes by differentiating, for example, the leading flanks of the pulses issued by squaring circuit 22.

One could double the frequency of the spikes and differentiate the leading as well as the trailing edges of the pulses from 22. That, however, may pose some unnecessary problems, because the spikes should have quite accurately constant repetition rate. Such constant repetition rate would require equally wide windows and opaque spacings in between having the same width. It is easier to manufacture a disk 14 with photographically imprinted markings wherein it is merely required that one edge of any marking is spaced equidistantly from the corresponding edges of the preceding and succeeding markings. It is more difficult (though readily conceivable) to imprint markings and spacings of similar width throughout.

The spikes as provided by circuit 23 are fed as reset signals to a counter 25, which is constructed as straight forward binary counter, and counts clock pulses from a source 27. These clock pulses pass a gate 28 presumed to be open.

By way of example, disk 15 may have 80 markings on its periphery, so that for a rotational speed of 3600 RPM the frequency of the sinusoidal waves is 4.8 KHz. The latter number is equal to the pulse rate frequency of the spikes; the counter 25, therefore, is cleared at that rate. The clock pulse frequency may be 250 KHz, so that 52 pulses are passed (or could be passed) to the counter before being reset.

As will become apparent shortly, it is reasonable to operate with a duty cycle of 50%. Accordingly, a digital count state detector 26 is connected to counter 25 to detect count state 26. Whenever count state 26 has been reached detector 26 responds and blocks gate 28. No more clock pulses will reach the counter which, therefore, holds at that count state, until the next reset pulse arrives from circuit 23 clearing the counter. Consequently, detector 26 will release gate 28 and clock pulses can pass again to be counted until count state 26 has been reached again, etc.

As a consequence of the operation described thus far, detector 26 provides a pulse train having the frequency of the reset pulses (spikes) provided to counter 25 by circuit 23; the pause between two detector 26 responses has a duration of precisely 26 clock pulses, and the detector pulse following such a pause is also about 26 clock pulses long, but varies with the rotational speed of motor 10 (FIG. 2). The pulse train, also called a pulse-pause sequence furnished by count state 26 detector is a signal arrived at digitally as representation of actual motor speed. This train is processed as analog signal as follows.

A constant voltage source 30 provides a constant voltage to a switching circuit 31 which receives the output pulse-pause sequence of 26. As a consequence, the pulses thereof are converted into a train of pulses having very accurately constant amplitude, they are free from switching ripples or the like as inherent in the output of the counter-count state detector combination 25/26. The pauses are clamped to a zero level. The average output voltage of circuit 31 is now precisely proportional to the motor speed. Any slowing of the motor delays the resetting of counter 25 and thus extends the duration of count state 26 response. Any motor speed increase results in an earlier resetting of the counter and shortens this pulse. The average voltage as provided by circuit 31 varies accordingly.

It can thus be seen, that the average output voltage of circuit 31 is a speed dependant quantity and results from a wave train defined by pauses of constant duration (zero level, 26 clock pulses) and by speed variable pulses of constant amplitude. However, the relation could be reversed, which is merely a matter of how to generate an output for detector 26. The pulses as non-zero level output voltages could be of constant width, while the pauses vary in length with motor speed. In the latter case average voltage and motor speed increse or decrease in the same sense. In the former case the output voltage of circuit 31 increases with decreasing speed and vice versa. However, this difference in operation is immaterial as it involves ultimately only the selection of the proper polarity of an error signal to be formed.

A filter 32 eliminates the variable component of the signal train from circuit 31 and thus establishes that averge voltage at a steady signal level. The filter has low pass characteristics, in that it does not eliminate those signal level changes representing motor speed changes as they are expected to occur. The roll off for the filter may be set close to the frequency of the reset pulses for the counter. Actually, the frequency of the counter reset pulses (i.e., the number of slots or windows in disk 14 passing detector 20 per unit time) is much higher than the frequency on any oscillatory speed changes of the motor, so that the relevant frequency bands are sufficiently far apart and do not interfere. The (still higher) frequency of clock 27 determines the resolution for ascertaining speed changes, as the pause between any two pulses from detector 26 varies in units of the clock pulses.

As stated, the selection of count state 26 as criterium for a changeover from pulse to pause was basically arbitrary, but represents a 50% duty cycle of detector operation, if the total number of clock pulses between two succeeding reset pulses for normal speed is twice the number detected by detector 26. Moreover, such an operating range represents the maximum range for bi-directional speed changes to be ascertained by changes in pulse duration. A voltage divider 33 established a voltage commensurate with the duty cycle or, more accurately, instrict correspondence to the pulse/-pulse-plus-pause ratio or pause/pulse-plue-pause ratio at the desired speed. Presently, this is a 1:2 ratio, and divider 33 provides a voltage representative thereof. The signal level for the pauses is the zero level from which the reference voltage is taken.

It appears, therefore, that the output voltage of divider 33 and the output voltage of filter 32 are equal if the motor runs at the desired speed. A differential or error signal amplifier 35 responds to that condition and feeds an output to a power amplifier 36, which in turn drives the motor 10. The latter condition closes the loop.

Any speed deviation imbalances the inputs for amplifier 35 and results in a control signal for power amplifier 36 tending to speed up or to slow the motor, so as to restore constant speed conditions at the desired level.

The control occurs quite fast as a change in motor speed by an amount exceeding the resolution threshold can be expected to be detected within a counter reset cycle. As stated above, disk 14 has 8 window markers, so that at least some control action takes place within about 1/80 of one revolution following a speed deviation that exceeds the resolution threshold. It was found, that motor speed is held readily within 1% in that manner, larger speed deviations will never be permitted to build up. Significantly, control pulses as such are not applied to motor 10, but only a steady or variable voltage without any "carrier" is used to drive the motor and adjust its speed. As a consequence, the motor runs very quiet.

One can see that the operation as outlined more specifically above follows several principles which can be generalized. The counter-clock pluse-detector combination 25, 27, 26 distinguished cyclically between two ranges of count numbers. The first range runs from zero to 26 and the second range is from 26 up to the number of pulses the counter would count if it were permitted to continue counting. The inhibition of the counting process is a convenient manner of derive a pulse-pause sequence from detector 26; the detector blocks gate 28 when detecting count state 26 and thereby arrests its own state by a closed loop lock. The loop is broken, when the counter is reset.

Thus, when we speak of two number ranges, we do not mean to imply that any counter does actually operate and count in these two ranges. In fact, counter 25 will never count more than 26 clock pulses and operates, therefore, within one range only. However, clock pulses do occur after detector 26 has responded, and in the general sense these pulses contribute to the metering operation for the duration of a detector-26 output pulse. The metering process is terminated with each counter reset pulse.

One could, however, operate with actual counting of clock pulses throughout; circuit 26 could include a flip flop which is set (or reset) in repsonse to count state 26. The counter continues counting, but the flip flop stays set (or reset) until its state is changed together with resetting of the counter. However, the illustrated mode of operation is preferred because a smaller counter suffices.

Another modification that is conceivable lies in the use of reflective rather than transparent markings on disk 14. However, the problem of stray light is more easily handled when transparent markings are used, because lamp and detector can be placed on opposite sides of the disk in this case only.

Generally speaking, it can be seen that following each reset pulse as derived from the disk-scanner assembly a pulse (or a pause) of fixed duration is metered, and the duration of the subsequent pause (or pulse) varies with the frequency of the reset pulses, i.e., with motor speed. Averaging the pulse-pause sequence as to signal level establishes a speed dependant steady signal to be used for control of the motor.

The invention is not limited to the embodiments described above but all changes and modifications thereof not constituting departures from the spirit and scope of the invention are intended to be included.

I claim:

1. Speed control apparatus for a motor, preferably a low inertia motor with high speed response as to any speed changes, comprising:
   a disk coupled to the motor and rotating therewith and having a plurality of annularly arranged detectable markings;
   detector means disposed in relation to said disk for scanning the markings and providing a train of reset pulses having pulse rate frequency considerably larger than the rotational frequency of the disk;
   a counter connected to count clock pulses having a frequency considerably higher than the frequency of said reset pulses, the counter being connected to be reset by said pulses, to begin counting again following each resetting;
   count state detector means connected to said counter and providing a pulse train at a pulse rate frequency corresponding to the frequency of said reset pulses wherein each pulse represents a first range of numbers of clock pulses and each pause as following a pulse represents a second range of numbers of clock pulses, the count state detector means responding to a number separating said first range from said second range;
   filter means connected to receive said pulse train and providing a steady electrical signal that is the d.c. equivalent and average of said pulse-pause sequence;
   electrical circuit means for providing an electrical reference signal; and
   error signal forming and control means connected to compare the reference signal with said steady signal and controlling the motor in response to said comparing.

2. Speed control apparatus as in claim 1, the count state detector means including a detector for detecting a particular count number; and means for inhibiting further receiving of clock pulses by the counter.

3. Speed control apparatus as in claim 1, and including circuit means connecting said means for providing a reference signal to said detector means to derive therefrom an amplitude for each said pulses, the pause having signal level equivalent to the zero signal level from which the reference signal is taken.

4. Speed control apparatus as in claim 3, wherein the means for providing a reference signal includes a source for a particular voltage potential and a voltage divider for deriving therefrom the reference voltage commensurate with the pulse/pause ratio of the pulse train as provided by said count state detector means.

5. Speed control apparatus as in claim 1, wherein the disk is opaque and has an annular track of transparent markings, the detector means being an optical-photoelectric detector.

6. A speed control apparatus for a motor driving a recording disk and provided for obtaining a constant driving speed, comprising:
   an optical disk coupled to said motor and having a plurality of annularly arranged reflective or transparent markings on a contrasting background;
   optical detector means disposed for scanning said markings during rotation of said optical disk to provide an oscillatory signal train;
   first circuit means connected to derive from said detector means a train of reset spikes;
   a source for clock pulses having a frequency considerably higher than a pulse rate frequency of said reset spikes;
   a counter connected to said source and to said first circuit means respectively to count said clock pulses and to be reset with each spike;
   count state detector means connected to said counter and providing a pulse train at a pulse rate frequency corresponding to the frequency of said reset pulses wherein each pulse represents a first range of count numbers of the counter and each pause as following a pulse represents a second range of count numbers, the count state detector means responding to a number separating said first range from said second range, the pulses having constant amplitude;
   filter means connected to receive said pulse train and providing a steady voltage that is the d.c. equivalent and average signal level of said pulse-pause sequence;
   second circuit means for providing a reference voltage, having fixed relation to said constant amplitude of said pulses;
   an error signal forming stage connected to said filter means and to said second circuit means for providing any error signal being the difference between the reference voltage and the steay voltage; and control means connected to the error signal forming means and to the motor to control the motor speed in response to said error signal.

7. Speed control apparatus as in claim 6, including third circuit means for deriving a constant pulse signal level from said second circuit means.

8. Motor speed control apparatus comprising:

a disk coupled to said motor for rotation therewith and having a plurality of annularly detectable markings;

sensor means responsive to each of said markings moving past a fixed point for producing reset pulses at a frequency considerably greater than the rotational frequency of said disk;

a source of clock pulses occuring at a frequency considerably greater than the frequency of said reset pulses;

means responsive to each of said reset pulses for resetting said counter means to an initial count;

count detector means responsive to said counter means counting to a predetermined count for inhibiting said counter means from further counting; and circuit means for producing a motor control signal indicative of the relationship between a first time duration from said initial count to said predetermined count and a second time duration from said predetermined count to a subsequent reset pulse resetting said counter means to said initial count.

9. The apparatus of claim 8 wherein said circuit means includes means for producing a voltage whose amplitude is related to the duty cycle between said first and second time durations.

* * * * *